Patented Aug. 5, 1930

1,772,336

UNITED STATES PATENT OFFICE

TANDY A. BRYSON, OF TROY, NEW YORK, ASSIGNOR, BY MESNE ASSIGNMENTS, TO TOLHURST MACHINE WORKS, INC., OF TROY, NEW YORK, A CORPORATION OF NEW YORK

PROCESS OF SEPARATING LIQUIDS AND SOLIDS

No Drawing.   Application filed October 5, 1926.  Serial No. 139,764.

The invention relates to a novel process for centrifugally separating a divided or fragmentary material, or small aggregated solids, and a liquid adherent on such material or solids.

Objects and advantages of the invention will be set forth in part hereinafter and in part will be obvious herefrom, or may be learned by practice with the invention.

The invention consists in the novel steps, sequences and processes herein described in an exemplary manner.

The invention is directed more particularly to separating aggregated multipartite solids, whether fragmentary or an aggregate of small solids, and a liquid adherent thereto in relatively small quantities.

Such a mixture can not be readily or profitably separated by ordinary centrifugal methods. For instance, if separation in the ordinary perforate basket is attempted, the separating force will be in the same proportion as is the ratio of the centrifugal force to gravity compared to the surface tension of the film of liquid adherent upon the solid. That is, the same ratio or per cent of the liquid would be thrown off from the solid, but as the original amount of adherent liquid is very small, the proportion thrown off would likewise be very small and the residue remaining still adherent upon the solid would be relatively large. Thus, this method would be commercially profitless.

Should separation be essayed in an imperforate basket, that is, if it is attempted to compact the solids against the cylindrical basket wall and to build a wall of the adherent liquid within the so compacted solids, and then draining the liquid out of the centrifugal, there is usually not enough of the liquid to build up such a wall. There is likewise a relatively large loss through the high proportion of the liquid which remains in the interstices of the solids or between the parts or particles of the solid. Thus this method also is commercially unprofitable by reason of its effecting such a small degree of separation.

By my invention an additional or auxiliary liquid, and usually a relatively large volume thereof, is added to the mixture of multipartite solids and adherent liquid, the liquids then being centrifugally separated from the solid and thereafter the two liquids are separated from each other, also preferably by centrifugal action. The process effects the removal of small amounts of valuable liquid from solid particles or fragments by increasing the volume of liquid by adding a chemically inert, and usually inexpensive liquid, and removing the mixed liquid centrifugally, and then separating the valuable liquid, also preferably centrifugally, from the added liquid.

A typical example of intermixed materials to which my process is applicable would be multipartite or fragmentary solids to which oil is adherent. A particular instance is fish scraps covered more or less thinly with oil, it being desirable but difficult to recover the oil from the scraps. The added liquid in this instance may be water, and this may be added at different times or at different stages or points in the process as may be found desirable or most efficacious, so far as concerns the broader features of the invention. The auxiliary liquid will be of less specific gravity than the solid, so that the solids will move to and compact against the basket wall and will not be floated out by the liquid or mixture of liquids.

In separating certain materials, the solid or solids with the adherent liquid may be placed in an imperforate centrifugal basket, and the auxiliary liquid, usually water, may be supplied while the basket is running. In the case of the oil as the adherent liquid, the water will displace the oil centrifugally, and due to the pressure will build up in the interstices between the pieces or particles of solid, displacing the oil therefrom by reason of its greater specific gravity. The layer of oil will be backed in toward the center of the basket, and will spill over the top ring of the basket or be discharged by any other suitable discharging means or device.

If the oil or other liquid to be separated emulsified with the water or other auxiliary liquid, sufficient water is used preferably to create an emulsion rather lean in oil, so that the loss of liquid remaining within the interstices of the solid at the end of the run will not represent a serious loss of oil.

The auxiliary or added liquid, in many cases, may be stirred into the mixture of oils and solids which is to be separated, before and preparatory to the first centrifuging. The procedure will be found advisable usually when the oil and water, or equivalent liquids, form an emulsion, and especially when the oil or other adherent liquid is not readily split off or detached from the solid, as the water comes into better contact with the solid particles by agitation, and a relatively large amount of water could be added in such cases to form the lean emulsion so as to avoid loss, as already described. The intermixing may be effected if desired in a mechanical agitator.

Where the auxiliary liquid does not emulsify with the original liquid, that is, the liquid which is adherent to and is to be separated from the solids, the auxiliary liquid must be of greater specific gravity than the original liquid in order to float the latter out, that is, so that the liquid to be separated may form the inmost wall or layer in the centrifugal. Also the auxiliary liquid must be of less specific gravity than the solids, in order not to float out the solid particles and so that they may be compacted by the centrifugal action into a wall or layer against the wall of the basket.

If the auxiliary liquid does emulsify with the original or adherent liquid, it may be of less specific gravity than the original liquid, because the emulsion may come out of the first centrifugal without breaking.

The final separation of the two liquids, namely, the auxiliary liquid and the original liquid is preferably effected in a high-speed separator or centrifugal of the cream separator type, which type is usually most efficient in effecting a sharp and clean separation of two liquids.

By the simple facile and inexpensive process of the present invention relatively very small quantities of valuable liquids which are adherent upon multipartite solids may be recovered almost entirely whereas they are practically irrecoverable by present processes.

What I claim is:—

1. The process of separating a multipartite material and a liquid adherent thereon which comprises adding thereto another liquid and subjecting to centrifugal action to separate the solid and liquids and subjecting the mixed liquids to centrifugal action to separate the liquids from each other.

2. The process of separating a multipartite material and a liquid adherent thereon which comprises adding thereto another liquid of less specific gravity than the solid and of greater specific gravity than the adherent liquid and subjecting to centrifugal action to separate the solid and liquids and subjecting the mixed liquids to centrifugal action to separate the liquids from each other.

3. The process of separating a multipartite material and a liquid adherent thereon which comprises emulsifying an added liquid with the adherent liquid, centrifugally separating the emulsion from the solid and then separating the emulsion into its constituent liquids.

4. The process of removing small quantities of valuable liquid from solid particles which comprises increasing the volume of the liquid by adding a chemically inert liquid, removing the mixed liquid by centrifugal action and then separating the valuable liquid from the added liquid by centrifugal action.

In testimony whereof, I have signed my name to this specification.

TANDY A. BRYSON.